UNITED STATES PATENT OFFICE.

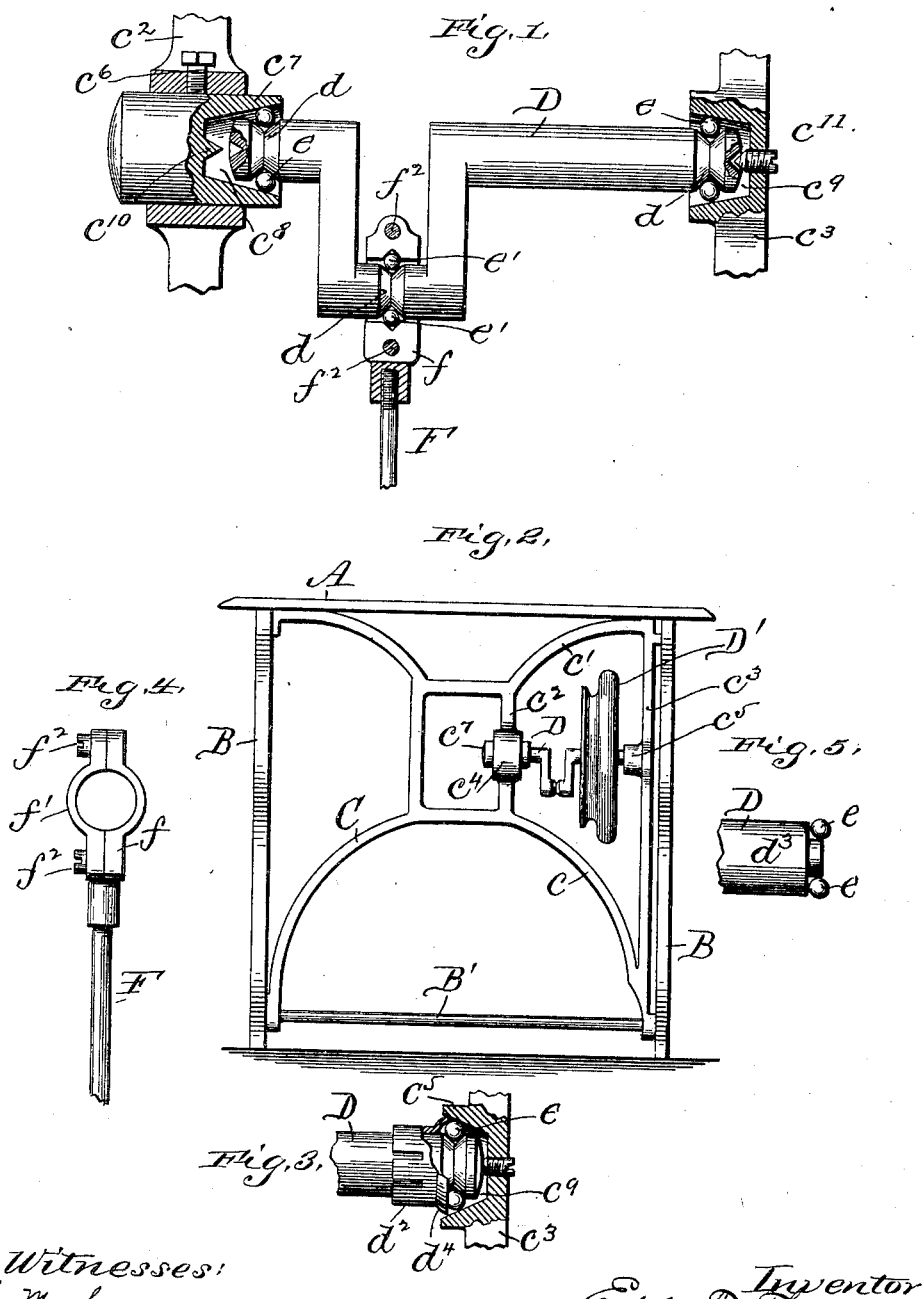

EDDY T. THOMAS, OF NEW YORK, N. Y., ASSIGNOR TO JOHN J. SULLIVAN, OF READING, MASSACHUSETTS.

SEWING-MACHINE-SHAFT HANGER.

SPECIFICATION forming part of Letters Patent No. 630,274, dated August 1, 1899.

Application filed April 26, 1897. Serial No. 633,978. (No model.)

*To all whom it may concern:*

Be it known that I, EDDY T. THOMAS, a citizen of the United States, and a resident of the city, county, and State of New York, have invented a new and useful Improvement in Sewing-Machine-Shaft Hangers, of which the following is a specification.

This invention has for its object to provide a simple and efficient construction adapted for use in sewing-machine stands and similar devices, whereby a treadle-operated driving or crank shaft may be mounted in such a manner as to run with a minimum of friction.

In the accompanying drawings, Figure 1 is a detail view, partly in section, showing a crank-shaft and its bearings constructed in accordance with my invention. Fig. 2 is an elevation of a sewing-machine stand with the crank-shaft and its driving-wheel mounted therein. Fig. 3 is a detail view of one end of the crank-shaft, showing one of the sleeves employed for excluding dust from the ball-bearings. Fig. 4 is a detail view of the upper end of the pitman, and Fig. 5 illustrates a slight modification of one end of the ball-bearing crank-shaft.

Referring to the drawings, A denotes the table, and B B the legs or side frames, of a sewing-machine stand, said legs or side frames being connected together by a cross-rod B' and a brace C.

D denotes the driving or crank shaft, provided with a driving or pulley wheel D' and mounted in a loop in the brace, said loop being formed by the parts $c$ $c'$ $c^2$ $c^3$, the part $c^2$ being provided with a shaft supporting or bearing portion $c^4$ and the part $c^3$ being provided with a shaft supporting or bearing portion $c^5$. Adjustably secured in the bearing portion $c^4$ by a set-screw $c^6$ is a bearing-block $c^7$, provided with a tapering recess $c^8$, the bearing portion $c^5$ being also provided with a similar tapering recess $c^9$. The crank-shaft D, the ends of which extend within the tapering recesses $c^8$ $c^9$, is provided near its ends with annular grooves $d$ for the reception of balls $e$, which are interposed between the grooved portions of the shaft and the inner walls of the said tapering recesses. The said crank-shaft is also preferably provided at its ends with conical recesses for the reception of bearing-points afforded, as herein shown, by a conical projection $c^{10}$, formed at the bottom of the tapering recess $c^8$ in the block $c^7$, and a center-screw $c^{11}$, tapped in the portion $c^3$ of the brace. The conical projection and center-screw referred to are adapted to serve as center bearings for the crank-shaft should the balls be removed or be broken or lost.

F denotes the pitman, having a head or portion $f$ at its upper end and provided with a cap $f'$, which is secured to the head $f$ by set-screws $f^2$. The crank to which the pitman is to be attached is preferably provided with an annular groove $d'$ for the reception of balls $e'$, which are to be interposed between the bottom of said groove and the wall of a corresponding groove formed in the head $f$ and cap $f'$ of the pitman.

To protect the ball-bearings from dust and also to serve as a housing for the balls, the crank-shaft D is preferably provided at its opposite ends with sleeves $d^2$, having flaring portions $d^4$, these sleeves being preferably slotted, so that they may be contracted sufficiently to have a strong frictional hold on the shaft in such a manner as to be retained in place.

Instead of the V-shaped annular grooves $d$, formed near the ends of the driving-shaft D, the said shaft may be formed with a shoulder $d^3$, as shown in Fig. 5, which will afford a ball-receiving recess between itself and the reduced end of the shaft.

From the foregoing it will be apparent that the tapering ball-receiving recesses into which the ends of the driving-shaft extend will afford means whereby any wear of the ball-bearings may be readily taken up simply by adjusting the block $c^7$, as may be required, the construction shown affording means whereby the driving-shaft will run at a minimum of friction.

Having thus described my invention, I claim and desire to secure by Letters Patent—

1. The combination with a driving or crank shaft having recessed or reduced end portions, of bearings for said shaft provided with tapering recesses into which the ends of the said shaft extend, one of said bearings being adjustable to compensate for wear, and balls interposed between the recessed ends of said shaft and the walls of said tapering recesses.

2. The combination with a driving or crank shaft having recessed or reduced end portions, of bearings for said shaft provided with tapering recesses into which the ends of said shaft extend, one of said bearings being adjustable to compensate for wear, and balls interposed between the recessed ends of said shaft and the walls of said tapering recesses, said shaft being provided near its ends with sleeves having flaring portions to serve as housings for the said balls in said tapering recesses.

3. The combination with the driving or crank shaft D provided near its ends with the V-shaped annular grooves $d$, of bearings for said shaft provided with tapering recesses into which the ends of said shaft extend, one of said bearings consisting of the adjustable block $c^7$, and balls in said tapering recesses interposed between the bottoms of said annular grooves and the walls of said bearings.

4. The combination with the driving or crank shaft D provided near its ends with the V-shaped annular grooves $d$, of bearings for said shaft provided with tapering recesses into which the ends of said shaft extend, one of said bearings consisting of the adjustable block $c^7$, balls in said tapering recesses interposed between the bottoms of said annular grooves and the walls of said bearings, and split sleeves $d^2$ having flaring portions $d^3$ to serve as housings for said balls.

5. The combination with the driving or crank shaft D provided with conical recesses in its ends, of bearings for said shaft provided with tapering recesses into which the ends of said shaft extend, one of said bearings being adjustable and both of said bearings being provided with pointed or conical bearing-points to enter the said conical recesses in the end of the shaft.

In testimony that I claim the foregoing as my invention I have signed my name, in presence of two witnesses, this 21st day of April, 1897.

EDDY T. THOMAS.

Witnesses:
L. HENSEL,
ALEXR. MELHADO.